United States Patent
Namuduri et al.

(10) Patent No.: US 7,420,350 B2
(45) Date of Patent: Sep. 2, 2008

(54) METHODS AND APPARATUS FOR AN ACTIVE FRONT STEERING ACTUATOR

(75) Inventors: Chandra S. Namuduri, Troy, MI (US); Robert R. Bolio, Clarkston, MI (US); Willard A. Hall, Dryden, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 25 days.

(21) Appl. No.: 11/560,876

(22) Filed: Nov. 17, 2006

(65) Prior Publication Data
US 2008/0116834 A1    May 22, 2008

(51) Int. Cl.
  G05B 11/42    (2006.01)
  G05B 11/01    (2006.01)
(52) U.S. Cl. .................. 318/610; 318/560; 318/609; 318/590
(58) Field of Classification Search .......... 318/432–434, 318/560, 590, 599, 606, 609, 610, 811, 867
See application file for complete search history.

(56) References Cited

U.S. PATENT DOCUMENTS

| | | | | |
|---|---|---|---|---|
| 6,731,085 B2 * | 5/2004 | Sardar et al. | ................. | 318/434 |
| 7,187,153 B2 * | 3/2007 | Imagawa et al. | ............ | 318/638 |
| 7,298,109 B2 * | 11/2007 | Sakamaki et al. | ........... | 318/489 |
| 2006/0145652 A1 * | 7/2006 | Ta et al. | ...................... | 318/807 |

* cited by examiner

Primary Examiner—Taghi T. Arani
Assistant Examiner—Thai Dinh

(57) ABSTRACT

An active front steering system includes a motor controller configured to compute a position error from a commanded position value and an actual position value, and then enter one of two modes—a commutation enable mode and a commutation freeze mode—depending upon the value of this position error. The commutation freeze mode applies when the absolute value of the position error is less than a predetermined threshold, and involves sending a set of signals to the motor's phase inputs such that commutation of the motor is prevented and a substantially constant motor hold torque is produced. The commutation enable mode applies when the absolute value of the position error is greater than or equal to the predetermined threshold, and corresponds to normal commutating operating mode.

20 Claims, 3 Drawing Sheets

METHODS AND APPARATUS FOR AN ACTIVE FRONT STEERING ACTUATOR

TECHNICAL FIELD

The present invention relates generally to vehicle steering control systems and, more particularly, to actuators used in connection with active front steering systems.

BACKGROUND

Hydraulic power assist steering systems incorporate an engine-driven hydraulic pump coupled to the hydraulic steering gear of the vehicle. The direction and magnitude of assist provided by the hydraulic system is determined by a valve that is actuated by a torsion bar provided between the steering hand wheel and a fixed end of the steering column.

Active front steering systems typically use a geared brushless DC electric motor to augment the hand wheel steering angle. The steering wheel is decoupled from the torsion bar of the conventional hydraulic power assist steering system and a superposition gear box is utilized between the shaft of the hand wheel and that of the torsion bar. The electric motor is coupled to the superposition gear in such a way that, when the motor is prevented from rotating, the rotation of the torsion bar follows that of the hand wheel. If the motor is commanded with a positive or negative angle, however, the commanded angle is added or subtracted from that of the hand wheel after being reduced by an appropriate gear ratio, and is applied to the torsion bar.

Brushless DC motors used in connection with active front steering systems typically include commutation logic for the three motor phases based on three position sensors spaced at 60° or 120° (electrical degrees). The phases are switched whenever a transition of a position sensor is detected, and a closed-loop position control system utilizes a proportional-differential (P-D) control scheme with high gain in order to achieve high precision. Unfortunately, this control scheme can cause undesirable chattering and vibration of the system during operation near a sensor transition point, as the repeated commutations can cause torque disturbances.

Accordingly, it would be desirable to provide improved steering control schemes that reduce torque disturbances and the resulting chatter and vibration. Other desirable features and characteristics of the present invention will become apparent from the subsequent detailed description and the appended claims, taken in conjunction with the accompanying drawings and the foregoing technical field and background.

SUMMARY OF THE INVENTION

In general, an active front steering system in accordance with the present invention includes a motor controller configured to compute a position error from a commanded position value and an actual position value, and then enter one of two modes—a commutation enable mode or a commutation freeze mode—depending upon the value of this position error. The commutation freeze mode applies when the absolute value of the position error is less than a predetermined threshold, and involves sending a set of signals to the motor's phase inputs such that commutation of the motor is prevented and a substantially constant motor hold torque is produced. The commutation enable mode applies when the absolute value of the position error is greater than or equal to the predetermined threshold, and corresponds to normal commutating operating mode.

DESCRIPTION OF THE DRAWINGS

A more complete understanding of the present invention may be derived by referring to the detailed description and claims when considered in conjunction with the following figures, wherein like reference numbers refer to similar elements throughout the figures.

DESCRIPTION OF AN EXEMPLARY EMBODIMENT

The following detailed description is merely illustrative in nature and is not intended to limit the scope or application of possible embodiments. Furthermore, there is no intention to be bound by any expressed or implied theory presented in the preceding technical field, background, brief summary or the following detailed description.

Various embodiments may be described herein in terms of functional and/or logical block components and various processing steps. It should be appreciated that such block components may be realized by any number of hardware, software, and/or firmware components configured to perform the specified functions. For the sake of brevity, conventional techniques related to steering systems, electric motors, control systems design, digital systems, and analog circuitry are not described herein.

In general, an active front steering system in accordance with one embodiment of the present invention includes a DC motor (e.g., a three-phase brushless motor), a position sensor, and a motor controller configured to compute a position error and then enable one of two modes—a commutation enable mode or a commutation freeze mode—depending upon the value of this position error. The commutation enable mode applies when the absolute value of the position error is greater than or equal to the predetermined threshold, and corresponds to normal commutating operating mode. The commutation freeze mode applies when the absolute value of the position error is less than a predetermined threshold, and involves sending a set of signals to the motor's phase inputs such that commutation of the motor is prevented and a substantially constant motor hold torque is produced. In this way, further rotation of the motor is prevented around the commutation transition points, reducing undesirable torque disturbances.

Figure 1:
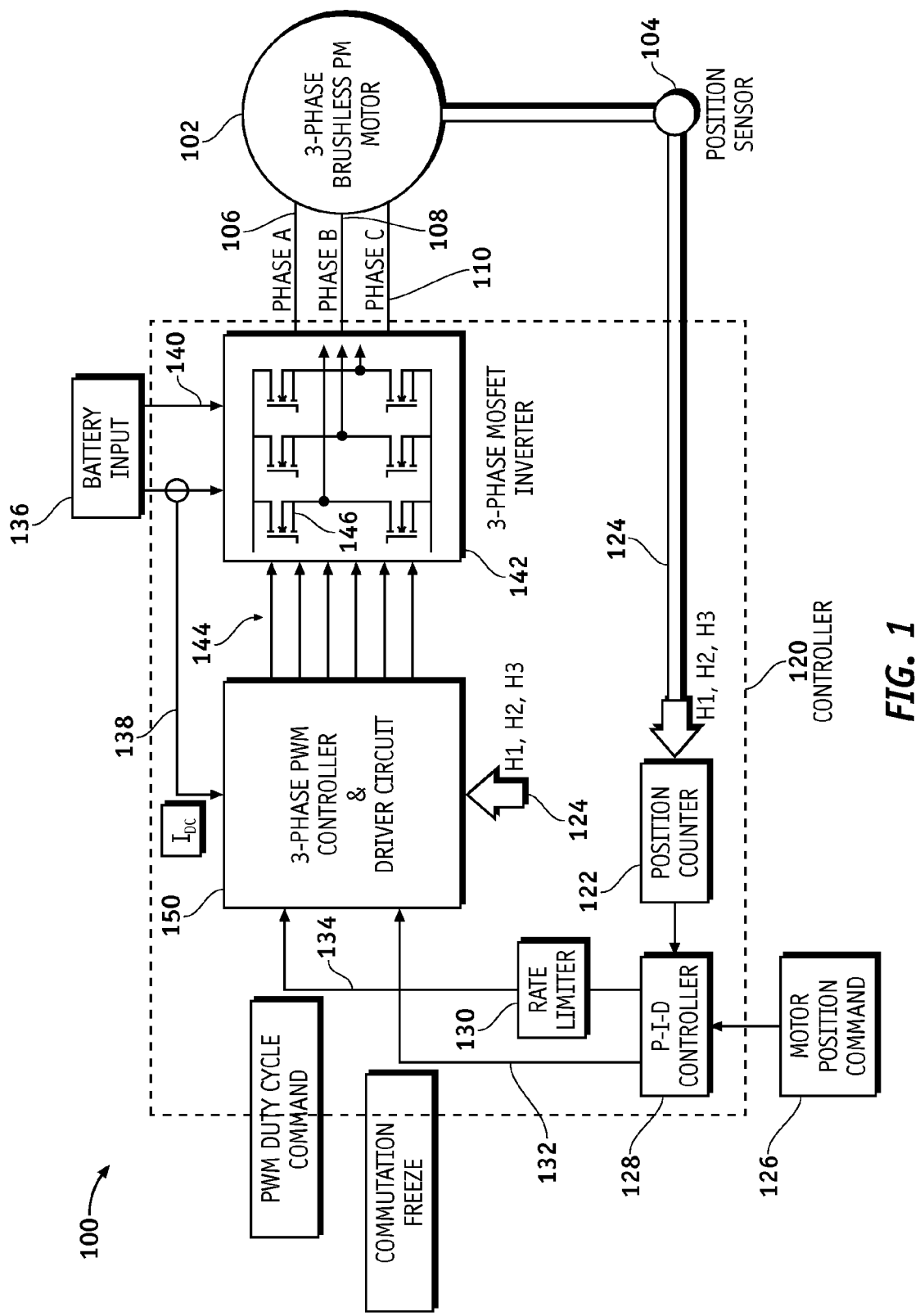
FIG. 1 is a schematic overview of a steering control system in accordance with one embodiment of the present invention.

Referring to FIG. 1, an active front steering (AFS) system ("steering system," or simply "system") 100 in accordance with one embodiment of the present invention includes a motor controller 120 communicatively coupled to a motor 102 (e.g., a three-phase brushless motor) having a position sensor 104 associated therewith, wherein motor 102 is mechanically coupled to an automotive steering column through a reduction gear (not shown) in the conventional manner. Controller 120 accepts input in the form of actual position information 124 from position sensor 104, as well as a motor position command 126 from an external source (e.g., a vehicle supervisory controller). A suitable power source (e.g., battery input 136) is also provided.

In the illustrated embodiment, motor controller 120 includes a PWM controller and driver circuit (or "PWM circuit") 150, an inverter 142 (e.g., a three-phase MOSFET inverter), a rate limiter 130, a position counter 122, and a proportional-integral-differential (P-I-D) controller 128 as shown.

In general, motor controller 120 is configured to freeze the commutation of motor 102 when the position error (i.e., the difference between the motor position command 126 and actual position determined via position sensor 104) is within a desired band around zero. A hold torque is generated by a predetermined voltage across selected motor phases (106, 108, 110) during commutation freeze to prevent motor 102 from further rotation. If the position error exceeds a predetermined level, normal commutation is restored and the system brings the position error within the desired band.

Figure 2:
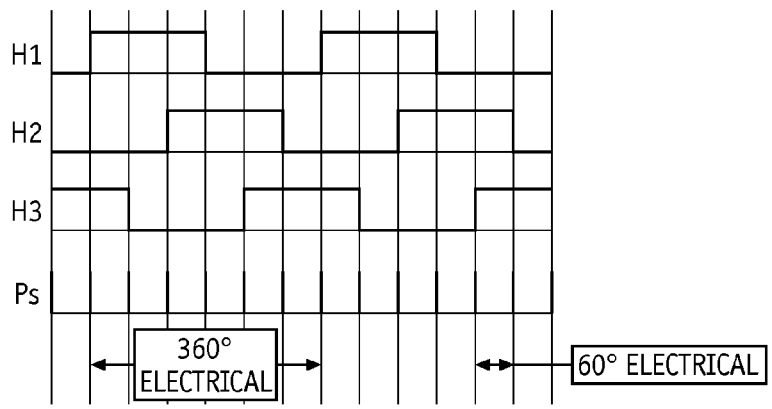
FIG. 2 is a graph showing the generation of actuator incremental positions from motor position sensor signals.

Position counter accepts position information 124 (i.e., signals H1, H2, and H3) from position sensor 104, and then sends the output to P-I-D controller 128. In this regard, FIG. 2 is graphical depiction of how actuator incremental positions may be generated from the motor position signals. The horizontal axis shows 60-degree phase intervals, and the vertical axis shows waveforms corresponding to each of the three phases (H1, H2, H3) of position sensor 104 and resultant pulse output (Ps). As shown, each phase H1, H2, and H3 produces a square wave having a period of 360 electrical degrees, and are spaced apart by 60 degrees. The rising and falling edges of each waveform produce a respective pulse $P_s$. These pulses are then processed by counter 122 to determine the position $\theta_m$ of the AFS actuator motor 102 after gear reduction. Every pulse indicates an incremental motor output angle and a corresponding incremental steering angle after the gear reduction. The relation between the incremental motor electrical angle obtained from the position sensor pulses $P_s$ and the incremental steering angle at the output of the gear reducer is given by $\Delta\theta_m = (2*60)/$(number of motor poles*gear ratio) in mechanical degrees. For example, with an 8-pole motor having a gear reduction of 50 between the motor shaft and the steering column, each pulse $P_s$ indicates an incremental steering angle of 0.3° at the output of the gear reducer on the motor shaft.

P-I-D controller 128 compares the actual position value derived from position counter 122 with the desired motor position command value 126, which is typically received from a vehicle supervisory controller or other such entity (not shown). Controller 128 determines the position error based on these values (i.e., subtracting the actual position value from the commanded position value). P-I-D controller 128 then sends appropriate signals 132 and 134 (the latter through rate limiter 130) to PWM circuit 150.

Figure 4:
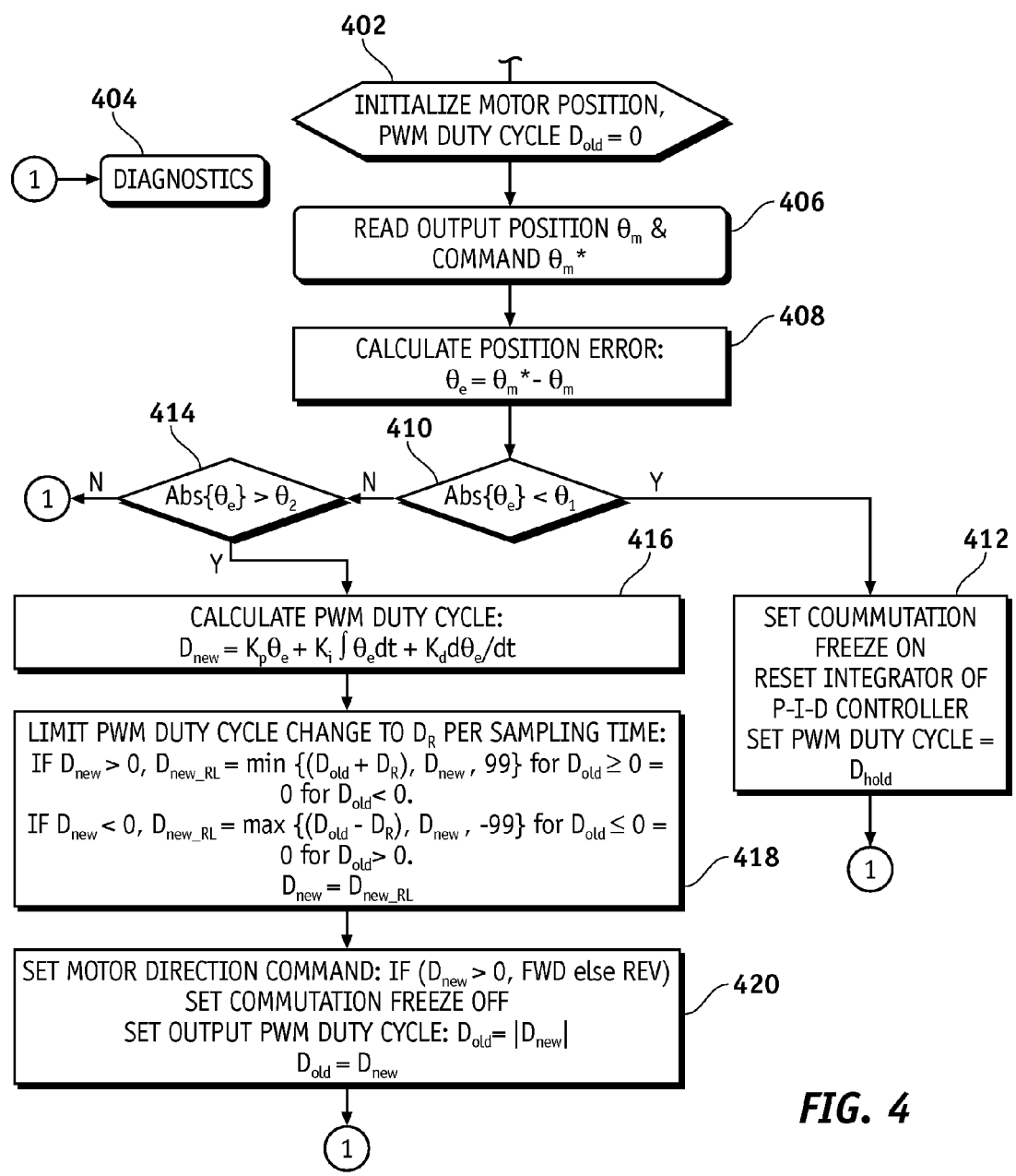
FIG. 4 is a flowchart depicting an active front steering position controller method in accordance with one embodiment of the present invention.

In this regard, FIG. 4 is a flowchart showing a control method performed by P-I-D controller 128 in accordance with one embodiment of the invention. It will be appreciated, however, that the method may include additional steps, and/or may be just one part of a larger process.

First, in step 402, the system initializes motor position (as reflected at the output after the gear reducer) and sets the PWM duty cycle equal to zero ($D_{old}=0$). The system then reads output position $\theta_m$ (calculated using information from position sensor 104) and position command $\theta_m^*$ (from command 126). The system then calculates the position error in step 408 ($\theta_e = \theta_m^* - \theta_m$).

In step 410, the system determines whether the magnitude of the position error is less than some threshold value $\theta_1$ (i.e., whether the error is within some band around zero). This threshold value may be selected to achieve any given design objectives, but in one embodiment is between about 0.01 and 2.0 electrical degrees, preferably about 0.6 degrees for an 8-pole motor with a gear reduction of about 50.

If the position error is less than the threshold value, the system continues with step 412; if not, the system proceeds to step 414. At step 412, the system sets the commutation free "on" (via signal 132), resets the integrator of P-I-D controller 128, and sets the PWM duty cycle (signal 134) to "hold" level $D_{hold}$, after which the system returns. The value $D_{hold}$ may be selected to achieve any given design objectives, but in one embodiment is between about 5% and 25%, preferably about 10%. At step 414 (corresponding to the case where the error signal is not less than the threshold value), the system determines whether the error signal is greater than a second threshold value, $\theta_2$. If not, the system returns; If so, the system first calculates the new PWM duty cycle using a P-I-D control relationship, e.g.:

$$D_{new} = K_p\theta_e + K_i\int \theta_e dt + K_d\frac{d\theta_e}{dt}$$

The threshold value $\theta_2$ may be selected to achieve any given design objectives, but in one embodiment is between about 0.01 and 2.0 degrees, preferably about 0.3 degrees for an eight-pole motor with a gear reduction of about 50. In step 418, the rate is suitably limited (via rate limiter 130) in accordance with the sampling time and whether the new PWM duty cycle is greater than or less than zero, e.g.:

If $D_{new}>0$ and $D_{old}>=0$: $D_{new\_RL} = \min\{(D_{old}+D_R), D_{new}, 99\}$.
If $D_{new}>0$ and $D_{old}<0$: $D_{new\_RL}=0$.
If $D_{new}<=0$ and $D_{old}<=0$: $D_{new\_RL} = \max\{(D_{old}-D_R), D_{new}, -99\}$.
If $D_{new}<=0$ and $D_{old}>0$: $D_{new\_RL}=0$.

After which, $D_{new}$ is set to $D_{new\_RL}$ and the system proceeds with step 420, wherein the system sets the motor control direction command. That is, if $D_{new}>0$, then the direction command is set to forward ("FWD"). Otherwise, the direction command is set to reverse ("REV"). The system also sets the commutation freeze "off," sets the output PWM duty cycle $D_{out}=\text{Abs}(D_{new})$, and sets $D_{old}=D_{new}$. After doing so, the system returns.

It will be appreciated that the system may incorporate diagnostic features. That is, a diagnostic input 404 may be received prior to step 406, as shown. The diagnostic function may include several steps, including, but not limited to, reading current 138 at the inverter input, reading the motor winding and inverter temperatures (not shown), checking for overcurrent or over-temperature conditions and if such conditions exist, reducing the duty cycle of the PWM voltage applied to the motor windings.

PWM circuit 150 receives signals 132 and 134 from P-I-D controller 128 and rate limiter 130, position information H1, H2, H3 (124) from position sensor 104, and a DC current 138 from battery input 136. Driver circuit 150 produces a suitable output, e.g., a set of six outputs 144 used to drive the gates of a set of six corresponding MOSFETs within inverter 142.

In the commutation freeze state, when a "hold" PWM signal is desired (as determined by P-I-D controller 128), the output of circuit 150 is preferably a constant width value intended to maintain a constant torque in motor 102. In commutation enable mode, PWM circuit 150 produces normal signals producing the desired rotation of motor 20.

Figure 3:
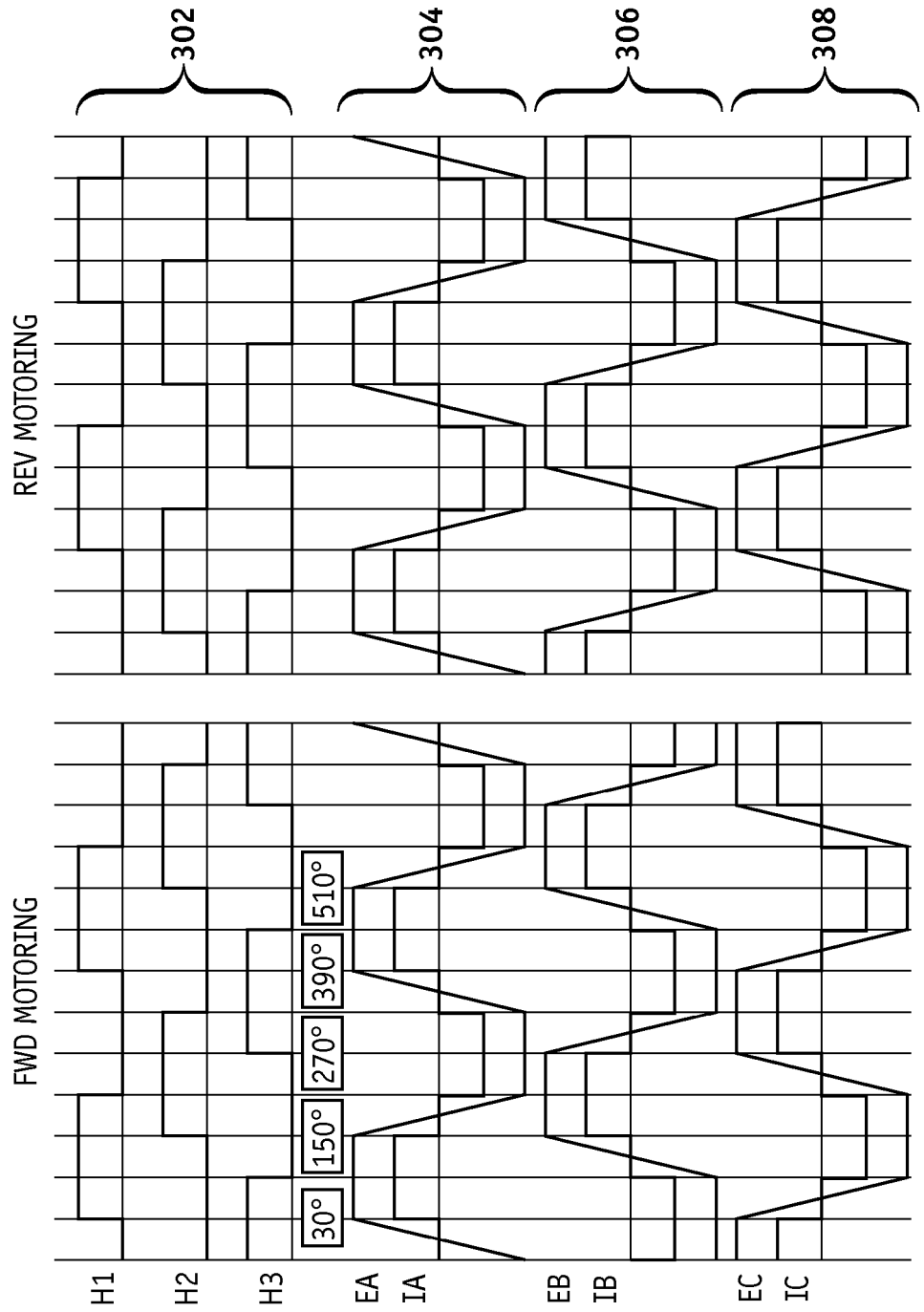
FIG. 3 is graph depicting three-phase motor commutation waveforms with respect to rotor angle.

Inverter 142 in this embodiment is a three-phase MOSFET inverter that produces three outputs corresponding to phase A (106), phase B (108), and phase C (110). FIG. 3 depicts exemplary three-phase brushless motor commutation waveforms as a function of rotor angle. The graph shows position sensor information 302 as well as corresponding voltage and current outputs (304, 306, and 308) for each phase (A, B, and C). In accordance with the present invention, as described in detail above, if the error is suitably small, commutation is prevented—i.e., the commutation sequence shown for each phase are effectively frozen, and the output is held substantially constant.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for controlling an electric motor coupled to an active front steering system in a vehicle, the electric motor of a type configured to rotate in response to signals received at a plurality of phase inputs, the method comprising:
    receiving an actual steering position value associated with a position of the electric motor;
    receiving a commanded steering position value;
    computing a position error from the commanded steering position value and the actual steering position value;
    placing the electric motor in a commutation freeze mode when an absolute value of the position error is less than a predetermined threshold by sending to a set of signals to the phase inputs such that commutation of the motor is prevented and a substantially constant motor hold torque is produced; and
    placing the electric motor in a commutation enable mode when the absolute value of the position error is greater than or equal to the predetermined threshold.

2. The method of claim 1, wherein receiving the actual steering position value includes receiving three sensor signals spaced at increments of 60 electrical degrees.

3. The method of claim 1, wherein the electric motor is a three-phase electric motor.

4. The method of claim 1, wherein the set of signals to the phase inputs during the commutation freeze mode includes a substantially constant pulse-width-modulation (PWM) signal.

5. The method of claim 1, further including applying a rate limit to the phase inputs when the electric motor transitions from the commutation freeze mode to the commutation enable mode.

6. The method of claim 1, further including producing a proportional-integral-differential (P-I-D) output based on the position error, wherein the set of signals sent to the phase inputs are based on the P-I-D output.

7. The system of claim 1, wherein the predetermined threshold is between 0.01 and 2.0 degrees.

8. An active front steering system comprising:
    an electric motor coupled to a steering system, the electric motor configured to rotate in response to signals received at a plurality of phase inputs;
    a position sensor coupled to the electric motor and configured to provide an actual position value;
    a controller coupled to the electric motor and the position sensor, the controller configured to: receive a commanded position value; compute a position error from the commanded position value and the actual position value; place the electric motor in a commutation freeze mode when an absolute value of the position error is less than a predetermined threshold by sending to a set of signals to the phase inputs such that commutation of the electric motor is prevented and a substantially constant motor hold torque is produced; and place the electric motor in a commutation enable mode when the absolute value of the position error is greater than or equal to the predetermined threshold.

9. The system of claim 8, wherein the actual position value produced by the position sensor includes three pulsed sensor signals spaced at 60 electrical degrees.

10. The system of claim 9, wherein the controller includes a position counter coupled to the position sensor.

11. The system of claim 8, wherein the electric motor is a three-phase brushless motor.

12. The system of claim 8, further including a proportional-integral-differential (P-I-D) controller configured to receive the position error.

13. The system of claim 12, further including a rate limiter configured to apply a rate limit to a change in duty cycle of PWM phase voltage inputs when the electric motor transitions from the commutation freeze mode to the commutation enable mode.

14. The system of claim 12, further including a pulse-width-modulation (PWM) driver circuit configured to receive a duty cycle command and a commutation freeze command from the P-I-D controller.

15. The system of claim 14, further including an inverter configured to receive PWM signals from the PWM driver circuit and provide the signals to the phase inputs of the electric motor.

16. The system of claim 15, wherein the inverter comprises a three-phase MOSFET inverter.

17. The system of claim 8, wherein the predetermined threshold is between 0.01 and 2.0 degrees.

18. An active front steering system comprising:
    a three-phase electric motor coupled to a steering system, the three phase electric motor configured to rotate in response to signals received at a set of three phase inputs;
    a position sensor coupled to the three phase electric motor and configured to provide an actual position value of the three phase electric motor;
    a proportional-integral-differential (P-I-D) controller coupled to the three phase electric motor and the position sensor, the P-I-D controller configured to receive a commanded position value; compute a position error from the commanded position value and the actual position value; and produce a duty cycle output and a commutation mode output responsive to the position error;
    wherein the commutation mode output is a commutation freeze mode when the absolute value of the position error is less than a predetermined threshold and a commutation enable mode when an absolute value of the position error is greater than or equal to the predetermined threshold; wherein the duty cycle output is a substantially constant value when the absolute value of the position error is less than the predetermined threshold;
    a pulse-width-modulation (PWM) driver circuit coupled to the P-I-D controller and configured to produce a set of PWM signals in response to the commutation mode output and duty cycle output;

an inverter coupled to the PWM driver circuit for sending signals to the three phase inputs based on the set of PWM signals.

19. The system of claim 18, wherein the predetermined threshold is between about 0.01 and 2.0 electrical degrees.

20. The system of claim 18, further including a rate limiter coupled between the P-I-D controller and the PWM driver circuit, the rate limiter configured to apply a rate limit to the phase inputs when the three phase electric motor transitions from the commutation freeze mode to the commutation enable mode.

* * * * *